Oct. 7, 1958  G. V. MUMFORD  2,855,044
APPARATUS FOR TRANSFERRING AND TRIMMING PLASTIC ARTICLES
Filed Jan. 22, 1954  3 Sheets-Sheet 2
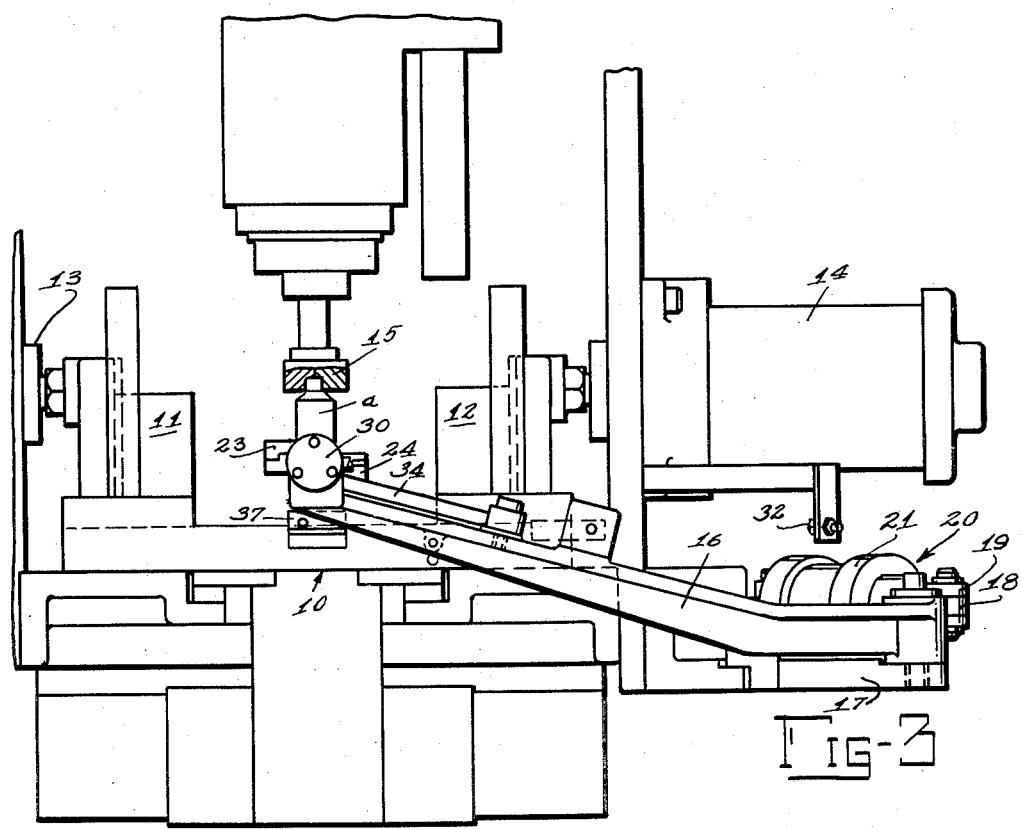
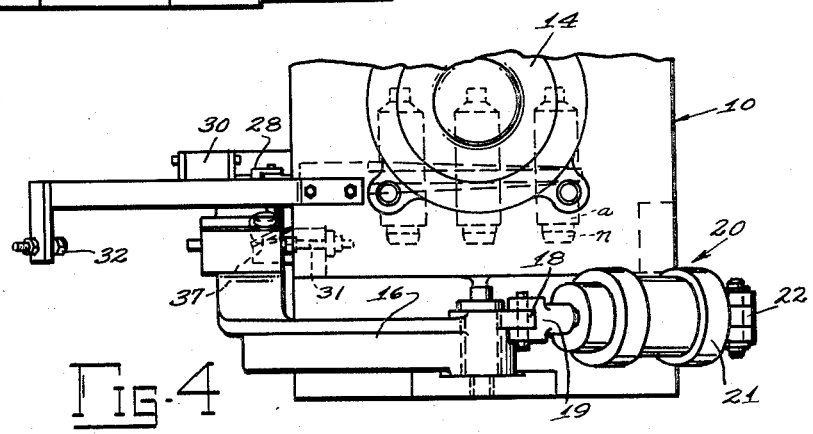
INVENTOR.
GEORGE V. MUMFORD
BY
ATTORNEYS

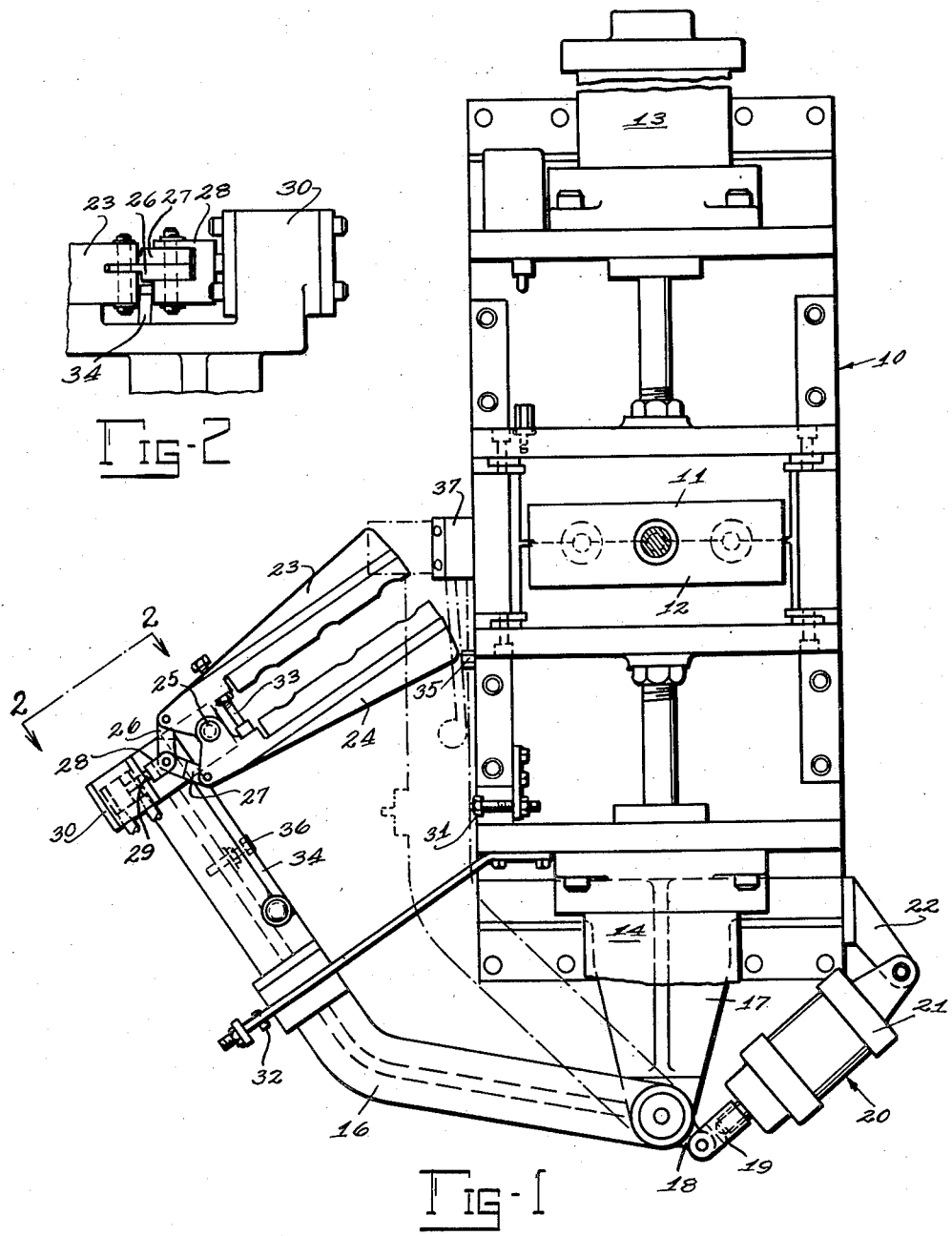

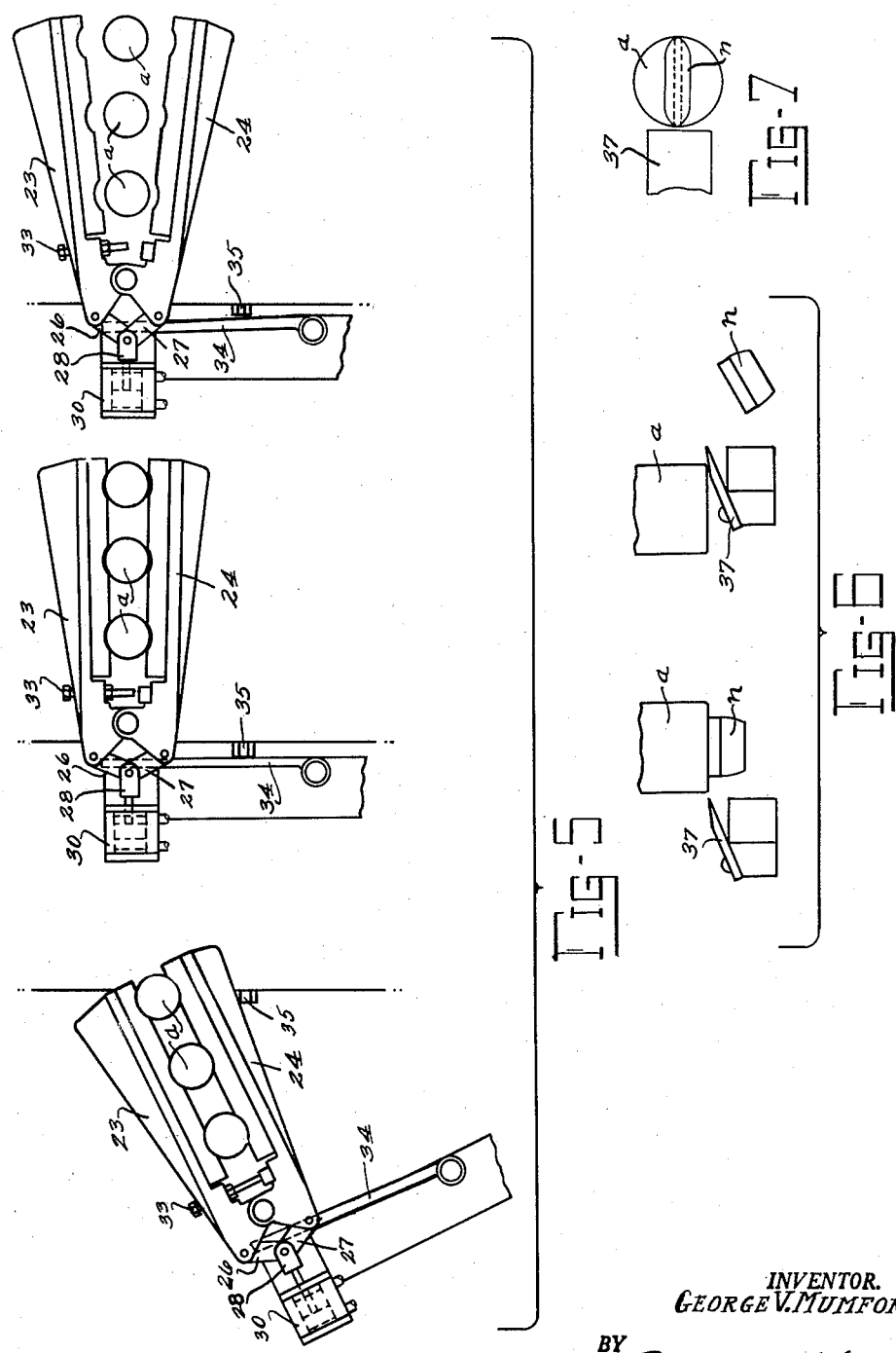

United States Patent Office 2,855,044
Patented Oct. 7, 1958

2,855,044

APPARATUS FOR TRANSFERRING AND TRIMMING PLASTIC ARTICLES

George V. Mumford, Toledo, Ohio, assignor to Owens-Illinois Glass Company, a corporation of Ohio Application January 22, 1954, Serial No. 405,640

4 Claims. (Cl. 164—38)

This invention relates to the manufacture of plastic articles, and more particularly to a method and apparatus for transferring plastic articles from an article forming machine and simultaneously trimming the hollow plastic articles.

According to certain methods of forming plastic articles, the plastic material is extruded or otherwise formed and then pinched between the sections of a mold to form an article by subsequent expansion or otherwise. The pinching of the plastic material produces an article having a tail or nubbin which must be trimmed in order to produce the finished article. In certain methods of forming hollow plastic articles the neck of the article is formed first and then the article is formed by expansion. In such methods the only trimming required is the removal of the tail or nubbin caused by the closing of the finishing molds.

It is an object of this invention to provide a method and apparatus for simultaneously removing the articles from the article forming mechanism and trimming the tail or nubbin. The invention is of particular importance when used in conjunction with an apparatus wherein the finished neck of the article is formed and the only part that needs to be trimmed is the tail or nubbin.

Other objects of the invention will appear hereinafter.

Basically the invention comprises gripping the article and causing a relative movement of the article with respect to a shear blade. More specifically, the article is moved in an arcuate path past a fixed shear blade which trims the tail or nubbin. The apparatus comprises an arm pivotally mounted to move in an arcuate path, on the end of which are mounted a pair of jaws adapted to be actuated for gripping the article. A shear blade is rigidly mounted along the path of the jaws in such a manner that the tail or nubbin strikes the shear blade, as hereinafter described.

Referring to the accompanying drawings:

Fig. 1 is a plan view of an apparatus embodying the invention;

Fig. 2 is an elevational view at the line 2—2 on Fig. 1;

Fig. 3 is a side elevational view of the apparatus showing the jaws in article gripping position;

Fig. 4 is a fragmentary end elevational view of the apparatus in the position shown in Fig. 3;

Fig. 5 is a diagrammatic representation of the article transferring steps; and

Figs. 6 and 7 are diagrammatic representations of the trimming operation.

Fig. 1 shows a portion of an apparatus for forming hollow plastic articles wherein the necks of a multiplicity of articles are first formed in neck molds. Lengths of tubing are provided integral with the necks and are suspended between the halves of a finishing mold. The finishing mold is closed about the lengths of tubing and air or other fluid under pressure is introduced through the necks to expand the tubing to hollow form. In this apparatus the tubing is pinched between the halves of the finishing mold. The resultant article which is formed is complete except for the tail or nubbin which is formed by the closing of the mold halves. This tail or nubbin must be trimmed to form the finished article. An apparatus for forming hollow plastic articles in this manner is disclosed and claimed in the application of George V. Mumford et al., Ser. No. 403,594, filed Jan. 12, 1954. Only that portion of the apparatus that is essential to describe my invention will be described herein.

As shown in Figs. 1 and 3, the apparatus comprises a frame 10 on which mold halves 11 and 12 are mounted for horizontal movement. Cylinders 13 and 14, respectively, are provided to actuate the molds and open and close them. A separable neck mold 15 is provided for vertical movement whereby sections of tubing may be suspended between the halves 11 and 12 of the finishing mold. Closing of the halves 11, 12 of the finishing mold pinches the sections of tubing, forming a tail or nubbin, as set forth in the aforementioned patent application.

As shown in Fig. 1, an arm 16 is pivotally mounted on a bracket 17 fixed to the frame 10. The arm includes a small projection 18 to which is fastened a clevis 19 threaded to the shaft of a piston motor 20. The cylinder 21 of the piston motor is pivoted to a small bracket 22 fixed to the frame 10.

A pair of jaws 23, 24 are pivoted on the end of the arm at 25. Means is provided for opening and closing the jaws and includes a pair of links 26, 27 connected to the jaws 23, 24, respectively. The links are fastened to a clevis 28 threaded to the shaft 29 of a small piston motor 30 which in turn is fixed to the arm.

Inward and outward movement of the arm is adjustably controlled by stops 31, 32 respectively. Inward movement of the jaws toward each other is adjustably controlled by a screw 33 threaded through one jaw 23 and contacting the other jaw 24. In the operation of the article removing apparatus, it is desirable that the articles be initially gripped with a light force. This is achieved by mounting a small movable arm 34 on the larger arm 16, which smaller arm 34 contacts a fixed stop 35 on the frame. In turn the arm 34 contacts the clevis (Fig. 2) and prevents the full closing of the jaws when the jaws are in the innermost position, as hereinafter described. The limit of rearward movement of the arm 34 against the clevis is adjusted by set screw 36.

A shear blade 37 is mounted on the frame 10 in such a position as to contact the tail or nubbin of the plastic article as it is removed by the jaws and arm.

The operation of the apparatus may be summarized as follows:

After the plastic articles have been formed and the finishing molds 11 and 12 have been opened, the plastic articles *a* remain suspended from the neck molds 15. A waste tail or nubbin *n* has been formed on each of the articles *a* by the pinching action of the molds 11 and 12 on the plastic material. Each nubbin *n* is connected to the article *a* by a seam of plastic material extending diametrically across the bottom of the article. The cylinder motor 20 is then actuated to move the arm 16 carrying the jaws 23, 24 into position surrounding the plastic articles. The small cylinder motor 30 is then actuated to close the jaws, lightly gripping the plastic articles. Complete closing of the jaws is prevented by contact of the clevis 28 with the arm 34, which in turn stops against stop 35. After the articles have been lightly gripped, the cylinder motor 20 is reversed moving the arm 16 and the jaws outwardly. As soon as the restraining action of the stop 35 on the arm 34 is removed, the small cylinder motor 30 is permitted to complete its action, fully closing the jaws 23, 24 and tightly gripping the plastic articles. As the arm continues its movement the lower end of each plastic article is brought in succession into contact with the shear blade, severing the nubbin, as shown in Figs. 6 and 7.

The movement of the plastic articles past the shear blade is such that the seam is substantially perpendicular to the shear blade. After the arm has moved to its outermost position the small cylinder is reversed to open the jaws releasing the plastic articles. The apparatus is then in position to begin another cycle.

The method and apparatus has been described as being of particular value when used in conjunction with a method of forming plastic articles wherein the neck of the article is formed in finished condition. It should be apparent that the method and apparatus may be applicable to other methods of forming articles wherein a tail or nubbin is formed.

The term tail or nubbin as used herein refers to any excess material on a plastic article, which must be trimmed to produce the finished article.

Modifications may be resorted to within the spirit and scope of the appended claims.

I claim:

1. In an apparatus for finishing plastic articles wherein the article as formed in a finishing mold has a neck, a body and a waste nubbin on the bottom of said body, said article being suspended by said neck from a neck mold, the combination of a takeout and trimming apparatus which comprises a movable takeout arm, article gripping jaws on said movable arm adapted to move forward with said arm into article gripping position, a stop adapted to simultaneously end said forward movement and to permit said jaws to initially lightly grip the article, a pressure device on said arm adapted to be actuated by the reverse movement of said movable takeout arm to permit increased gripping action of said jaws upon the article, means to move said takeout arm to and from the article gripping position, a shear blade positioned in the linear movement path of the nubbin on said article and adapted to sever said nubbin during the outward stroke of said arm, and a stop means limiting the reverse movement of said movable takeout arm and the article and adapted to release the articles from the gripping jaws.

2. In an apparatus for simultaneously finishing a plurality of plastic articles wherein each article after being formed in a finishing mold has a body, a waste nubbin and a neck and wherein each said article is suspended by its neck from its neck mold, the combination of a takeout and trimming apparatus which comprises a movable takeout arm, a plurality of article gripping jaws on said movable arm adapted to be alternately moved into article gripping and releasing positions, a stop adapted to end the forward movement of said arm at the gripping position and permit said jaws to initially lightly grip each said article, a pressure device on said arm adapted to be actuated by the reverse movement of said movable takeout arm to permit increased gripping action of each jaw upon each said article, a second stop limiting the reverse movement of said movable takeout arm and the said articles, a shear blade positioned in the linear path and junction plane of the nubbin on each said article, means to actuate said takeout arm and move said plurality of articles past said shear blade to thereby sever each said nubbin, and a valve means actuated by said movable takeout arm and adapted to simultaneously release the articles from the gripping jaws.

3. In an apparatus for simultaneously finishing a plurality of plastic articles wherein each article after being formed in a finishing mold has a body, a waste nubbin on one end thereof and a neck finish on the opposite end and wherein each article is suspended by said neck from a neck mold, the combination of a takeout and trimming apparatus which comprises a movable takeout arm, jaws thereon adapted for initially lightly gripping each formed article, a pressure device adapted to increase the gripping action of said jaws upon each article, a stop for limiting the takeout movement of said movable gripping jaws and contained articles, a shear blade positioned in the linear path of movement and the plane of the junction of the nubbins on each said article, means to move said arm and said gripping jaws into article gripping position and to sequentially move said jaws and their contained articles past said shear blade to sever each said nubbin, and valve means actuated by the takeout movement of said takeout arm to release the articles from the gripping jaws.

4. In an apparatus for simultaneously finishing a plurality of plastic articles wherein each said article after being formed in a finishing mold has a body, a waste nubbin on one end thereof and a finished neck portion on its opposite end, each said article being suspended by said finished neck portion from a neck shaping mold, the combination of a takeout and trimming apparatus which comprises a movable takeout arm, plural article gripping jaws thereon adapted for initially lightly gripping each said article, a stop for limiting the forward movement of said movable takeout arm and actuating the initial gripping of said articles, a pressure device adapted to permit increasing the gripping action upon each said article upon the outward movement of said arm, a shear blade positioned in the linear path of the junction of the nubbin on each said article, a fluid actuated device adapted to move said takeout arm and said articles past said shear blade to sever each said nubbin in succession, and valve means adapted to release the finished articles from the gripping means.

References Cited in the file of this patent

UNITED STATES PATENTS

| | | |
|---|---|---|
| 684,942 | Mercer | Oct. 22, 1901 |
| 781,509 | Fernow | Jan. 31, 1905 |
| 1,424,472 | Goldberg | Aug. 1, 1922 |
| 1,813,340 | Conti | July 7, 1931 |
| 1,891,749 | Conti | Dec. 20, 1932 |
| 1,934,660 | Fairchild | Nov. 7, 1933 |
| 2,203,255 | Deane | June 4, 1940 |

FOREIGN PATENTS

| | | |
|---|---|---|
| 308,330 | Germany | Oct. 9, 1918 |